F. C. SMART.
LATHE CHUCK.
APPLICATION FILED JUNE 17, 1918. RENEWED MAY 12, 1919.

1,325,915.

Patented Dec. 23, 1919.

Inventor:
Frank C. Smart,
By his Att'y, F. H. Richards.

F. C. SMART.
LATHE CHUCK.
APPLICATION FILED JUNE 17, 1918. RENEWED MAY 12, 1919.
1,325,915.
Patented Dec. 23, 1919.
4 SHEETS—SHEET 2.
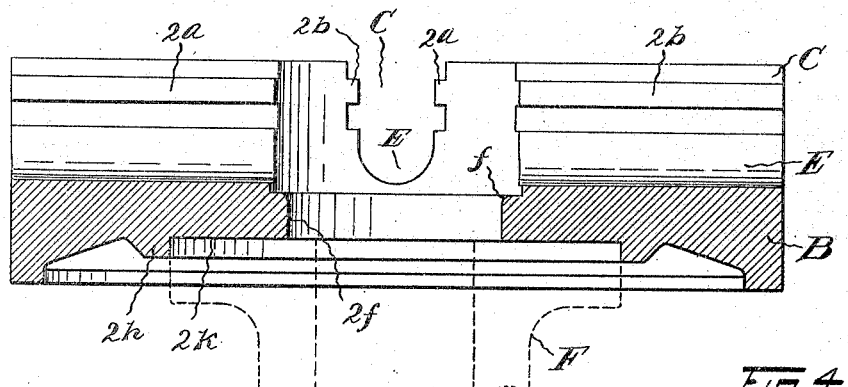
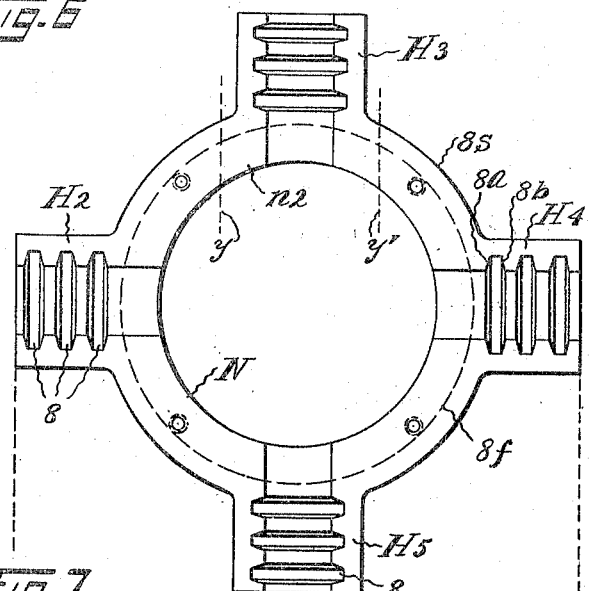
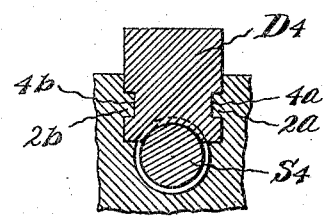
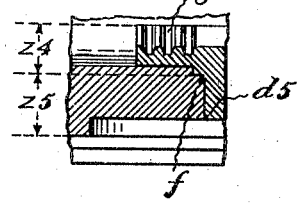
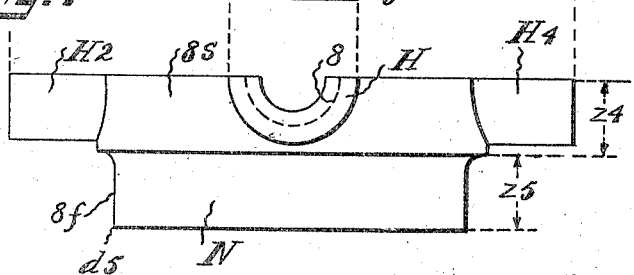
Inventor:
Frank C. Smart,
By his Att'y, F. H. Richards.

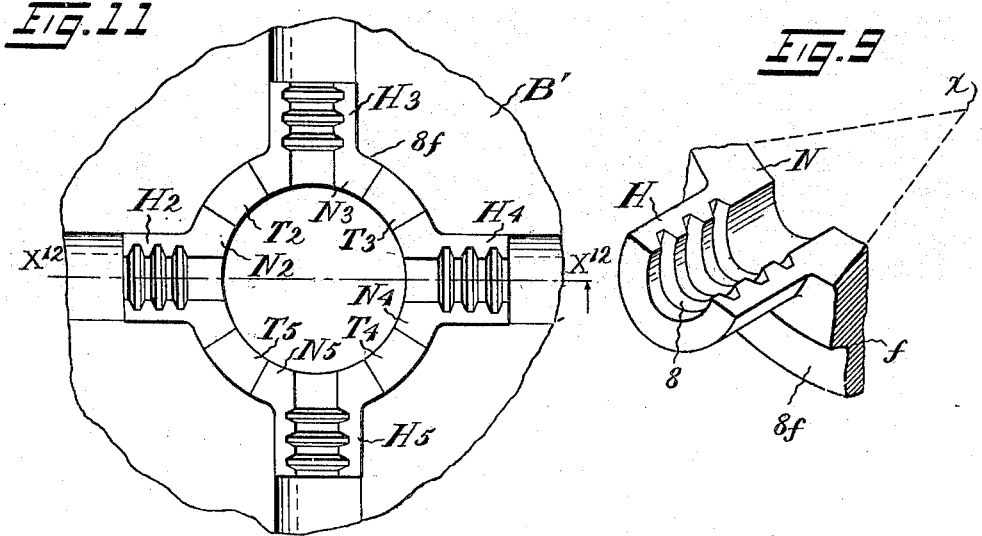
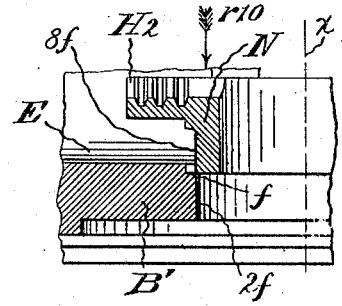
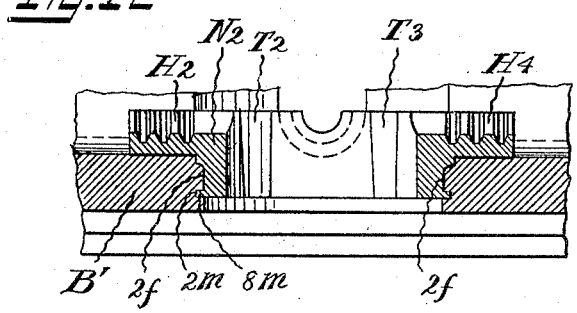
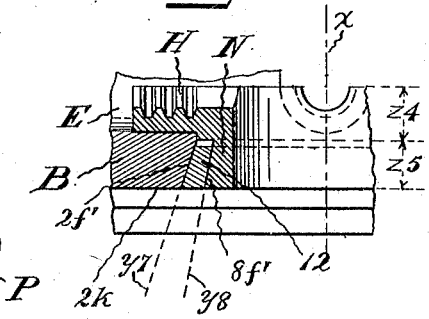
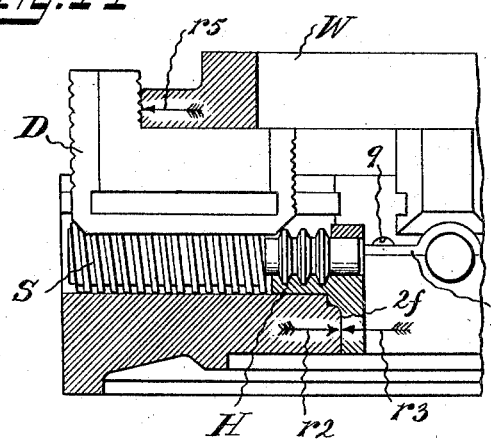

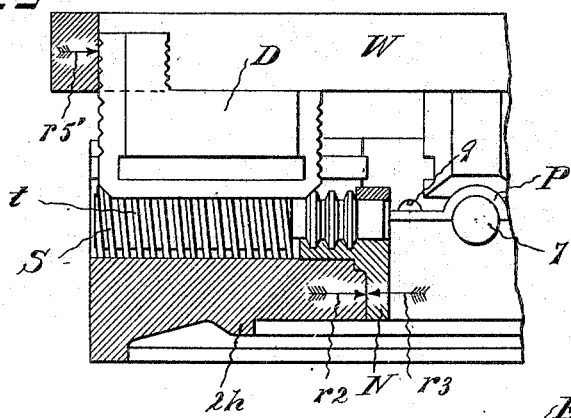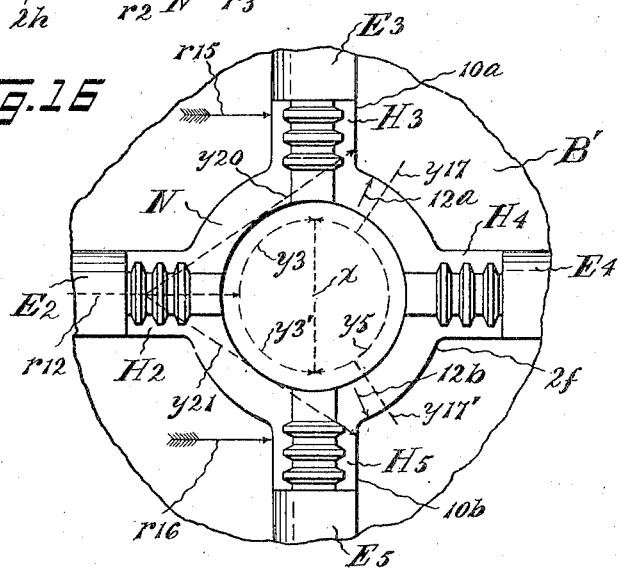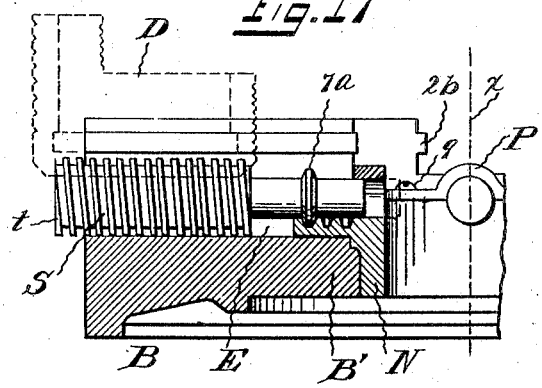

UNITED STATES PATENT OFFICE.

FRANK C. SMART, OF HARTFORD, CONNECTICUT.

LATHE-CHUCK.

1,325,915.        Specification of Letters Patent.        Patented Dec. 23, 1919.

Application filed June 17, 1918, Serial No. 240,381. Renewed May 12, 1919. Serial No. 296,538.

*To all whom it may concern:*

Be it known that I, FRANK C. SMART, a citizen of the United States, residing in Hartford, in the county of Hartford and State of Connecticut, have invented certain new and useful Improvements in Lathe-Chucks, of which the following is a specification.

A principal object of my present invention is to furnish an improved construction and organization of the jaw-operating screws and screw-holding bearings for use in that class of lathe chucks which are provided with a series of radially-disposed and slidable work-holding jaws. Further objects are hereinafter stated and explained. Chucks of this class are sometimes made with two or with three jaws, these being evenly spaced apart in the circumference of the chuck-body, but more generally the chuck jaws are four in number.

In the particular variety of chuck selected for illustration herein, the jaws are shown in a conventional form and are four in number, and they are preferably radially-disposed in the usual manner illustrated; but, it is to be understood that the term "radially-disposed" and other terms of similar import as used herein are, not to be strictly construed, and that they refer merely to the general or approximate arrangement, and do not require or imply an exactly radial positioning of any part or parts so designated.

In the accompanying drawings forming a part of this specification, Figure 1 is a plan view, (in this special art, also sometimes designated as a "front" view), of a lathe chuck of the class to which my present improvements are especially applicable; in this view, one portion is broken away for more clearly illustrating certain details.

Fig. 4 is a fragmentary cross-sectional view taken on line $X^3$, of Fig. 2; this view illustrates how the jaw,—as $D^4$,—may engage with the jaw-operating screw,—as $S^4$,—in the usual well-known manner.

Fig. 5 is a side view of one of the jaw-operating screws, S; this view, for convenience of comparison is drawn in alinement with and below one of said screws shown in Fig. 2.

Fig. 6 is a plan view drawn on an enlarged scale of the set of four screw-holding bearings as shown in Figs. 1 and 2; in this view, Fig. 6, said bearings are shown integral with a compression ring, N, which is also integrally formed throughout the circuit thereof.

Fig. 7 is a side view of the ring and bearing system of Fig. 6, and is drawn in alinement with and below Fig. 6, to facilitate comparison therewith.

Fig. 8 is a sectional side view, and Fig. 9 a perspective view of one of the screw-holding bearings shown as provided with an integrally-connected portion of the ring N forming an anchorage member for this bearing.

Fig. 10 is a fragmentary sectional view for illustrating an initial stage of the assembling operation, as hereinafter more fully explained.

Fig. 11 is a plan view illustrative of a ring-and-bearing system which is of a modified and composite construction as compared with the form thereof shown in Figs. 6 and 7.

Fig. 12 is a sectional view, taken approximately on the line $X^{12}$, Fig. 11, for further illustrating certain features indicated in preceding views, as hereinafter more fully explained.

Fig. 13 illustrates a modified means for contractively holding the bearing ring N; and, Figs. 14, 15, and 16, are diagrammatic views explanatory of the mode of action of said ring, N, in relation to the screw-holding bearings; and of the action of the work-holding strains in relation to said ring and bearings.

Fig. 17 is a sectional view similar to a portion of Fig. 2, but showing in a partially diagrammatic manner, a special arrangement to which my present improvements are adaptable for meeting certain special requirements.

Similar characters designate like parts in all of the views.

Figure 1:
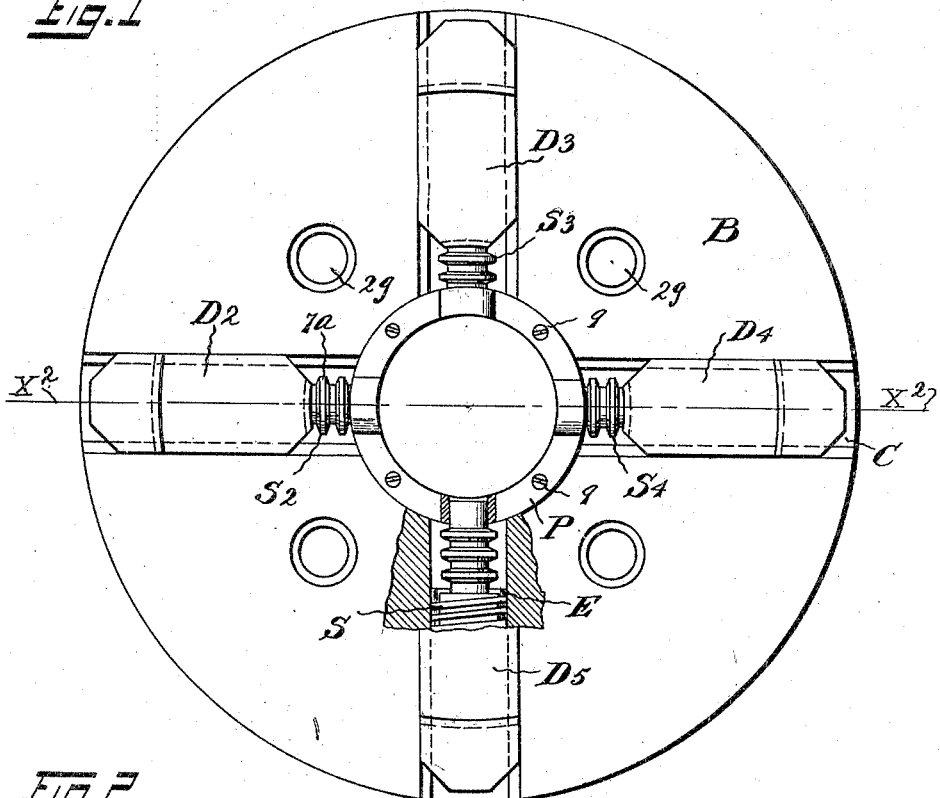

Referring to the drawings, in Figs. 1, 2, 3, the chuck-body member, B, is shown of a common form, excepting as to certain features in connection with the screw-holding bearings, as hereinafter explained. Said member B has formed therein a series of slots or guide-ways, as C, (Fig. 3), which are or may be radially-disposed, and which are fitted with ribs and grooves coactive with corresponding features of the jaws D, respectively. The guide-ways C are extended downwardly, and are shaped at the bottom thereof, to form the guideways E for the jaw-operating screws S, respectively.

In the present instance, the body member B is shown as having only a single pair of ribs, as $2^a$, $2^b$, which engage in a corresponding pair of grooves, as $4^a$, $4^b$, of the jaw D, so that this jaw is slidable on and guided by the ribs of the body-member in a well-known manner. Thus the jaw D is shown herein as having formed in each side thereof, only a single groove, as $4^a$ or $4^b$, but in some instances,—and according to a common practice,—a plurality of such coacting ribs and grooves (not herein shown) may be provided,—in a well-known manner,—on each side of any one or more of the jaws.

The several chuck-jaws are herein referred to as "jaws D," and individually without choice as "jaw D," but for convenience of reference,—especially in comparing the drawings,—the four jaws D are herein separately indicated by the characters $D^2$, $D^3$, $D^4$, and $D^5$, respectively. Similarly, the four jaw-actuating "screws S," but are separately indicated by the characters $S^2$, $S^3$, $S^4$, and $S^5$, respectively. This notation method is also applied herein to the guide-ways C and E, for the jaw D and screw S, respectively,—also, to the screw-holding bearings H, hereinafter described. The jaws D are herein shown as being duplicates and also of a common reversible form, and as engaging (by a segmental nut integral with the jaw) in a well-known manner with the screw thread, as $t$, of the duplicate screws S, respectively.

The chuck-jaws, D, are usually provided with three or more work-holding faces, but only three such faces are herein shown. Two of these faces, $4^c$ and $4^d$, are shown formed in a usual manner on the ends of the jaw, while a third said face, $4^e$, is located (also in a usual manner) at some convenient or desired position intermediate to said jaw-ends. In the present instance, the shorter end-face $4^c$ is shown located on the inner end of the jaw D, which is nearest the axis of the chuck, while the face $4^e$ is an inwardly facing one. On reversing the chuck-jaw in the customary manner, (not herein shown), those positions of said faces relative to the body B will, of course, be reversed.

Figure 3:
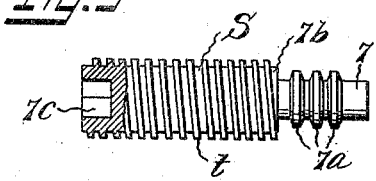
Fig. 3 is a cross-section of the chuck-body member, B, taken on said line $X^2$, $X^2$, of Fig. 1.

Since the class of chucks herein illustrated are especially adapted and intended for use when attached to the spindle of a lathe or analogous machine, it is customary to form on the back of the body member B, a face, as $2^k$, and a holding rim, as $2^h$, for receiving a flanged hub, as F, which is usually of the general form indicated by dotted lines in Fig. 3, and which, in accordance with a common practice, may be removably fixed to, or may be made integral with such a machine spindle. Hence it is also customary to make through said member B, a series of holes, as $2^g$, (Fig. 1), for a plurality of ordinary hub-holding bolts (not herein shown), by which to removably attach the chuck body to said member F, in a well-known manner. Necessarily, said bolt-holes $2^g$ are located in the spaces between the jaws D, as shown in Fig. 1, so that said holes extend through the thickest portions of the castings of which the chuck-bodies, as B, are manufactured. This circumstance, in view of the well-known limitations as regards the molding and casting operations, normally brings said holes $2^g$ in positions where "blow holes" are usually formed in the casting, and hence, in practice, methods and devices are resorted to by the foundrymen for minimizing these obstacles, and to thereby reduce the loss due to the wastage of expensive castings by reason of such defects.

While those methods,—the same being well-known,—need not be recited in detail here, it may be pointed out that, in many instances, one effect of said protective measures is to more widely and irregularly distribute such blow-hole defects within the body of the casting, so that,—in the progress of this line of manufactures,—it has become not only important but a practical necessity to devise some way or means whereby to provide effective screw-holding bearings which shall be so constructed and arranged as not to require cutting out any bearing-receiving spaces in the casting, and shall not require the making of any screw-threads, or any threaded holes in the chuck-body member. This utility and economy is one of the objects which has been completely attained by means of my present invention.

In accordance with the foregoing explanations, in manufacturing my improved chuck, the body-member, B, can be so molded and cast that the casting "in the rough" will correspond with unusual accuracy to the finished form, so that only a thin layer of metal needs to be removed in any part of the finished surfaces, not sufficient to open up or cut into the small blow-hole spaces which are unavoidably formed in various portions of the interior of castings and which in themselves, if not cut into, are not important. These conditions are especially noticeable and important as regards the semi-cylindrical surface of the guide-ways E, which can now, (contrary to the practice hitherto), be made uniform, and can also remain entirely unbroken, throughout their entire length and area, without any thrust-bearing device or other projections being formed or located therein, and without any recess or other space, socket or hole,—either threaded or otherwise,—formed or cut out in any part thereof. In this connection it will be remembered that when a thrust-bearing in the form of a rib is cast in place transversely in such a guide-way, the effect (supposed to arise chiefly from an interior shrinkage during cooling) is to cause a tendency for a blow-hole to locate or form directly adjacent to or under such rib or device, so that in machining the body-castings, these defects are "opened up," thereby spoiling the entire body-piece. Similarly, when such a guide-way is cast straight and "plain," the cutting out therefrom of a recess for receiving an ordinary annular thrust-bearing ring or member, likewise opens up small blow-hole spaces and thereby spoils many of the body-pieces.

A serious feature of the adverse conditions and circumstances thus only very briefly stated, is that in the manufacturing operations the spoiling of a body-piece in either of the ways outlined, usually does not occur until after a large proportion of the work of machining such piece has been performed, so that a considerable amount of expensive labor, and of the cost of operating the machinery and tools necessarily employed, is lost in addition to the loss of the casting itself. It is therefore, one object of my present invention, to substantially eliminate those large direct and indirect losses by providing an improved organization of chuck-mechanism in which, in the manufacturing of the chucks, the usual blow-hole and shrinkage effects here referred to will be first minimized, while such of those defects as may exist will not become a cause of waste and loss. For it is well known that generally such causes of loss are such only in a technical sense, and only become really objectionable when opened up by some machining operation of a kind not required in the making of the chuck herein illustrated. Furthermore, the machining operations required in the manufacture of this chuck are such as will seldom if ever cut deep enough to endanger any of the castings which are not obviously defective upon the usual inspection of their exterior surfaces before the castings are sent out from the foundry.

In this connection, it should be remembered that in practice the rigidity of the castings for the body member of the chucks, depends chiefly on the character of those portions of the metal which are at and near the surface, and that the metal in the mid-portions is relatively neutral as regards such tensile and compressive strains as are transmitted from the work and through the jaws, to the chuck-body. For these reasons such defects or slight porosity as described may exist at many points in the interior metal, without thereby affecting or impairing to any material extent the firmness and rigidity, or the resistance to flexure, of the chuck-body as a whole. In holding the work,—as indicated for instance in Fig. 14,— the jaws have in part the function of levers for transmitting a bending stress to the body B, which thus partakes of the function of a beam as regards the strains set up therein in opposition to such bending force.

Having in view the general features of the chuck as already set forth, it will be seen by comparing Figs. 1, 2, and 5 to 7, that the thread, $t$, of screw S is continuous and uninterrupted throughout its length; and, that on their inner ends, the screws S are prolonged in the form of a journal, 7, which is provided with one or more rib-like rings that are in the nature of thrust-bearings, or thrust collars. In the present instance, these collars, $7^a$, are shown three in number, and in external diameter they correspond with the diameter of the body portion $7^b$ of the screw S, inside of the thread $t$; so that the jaws D may pass over said collars in the usual manner, without interference, as will be evident from Figs. 2 and 4. Said journal-ends, 7, are shown fitted to turn in bearings H, which are fitted into the guide-ways E, respectively, and are located and secured in position at the extreme inner ends of these guide-ways,—see Figs. 1, 2, 13, and 16,— and are therein maintained preferably by the means and in the manner hereinafter more fully explained.

Figure 2:
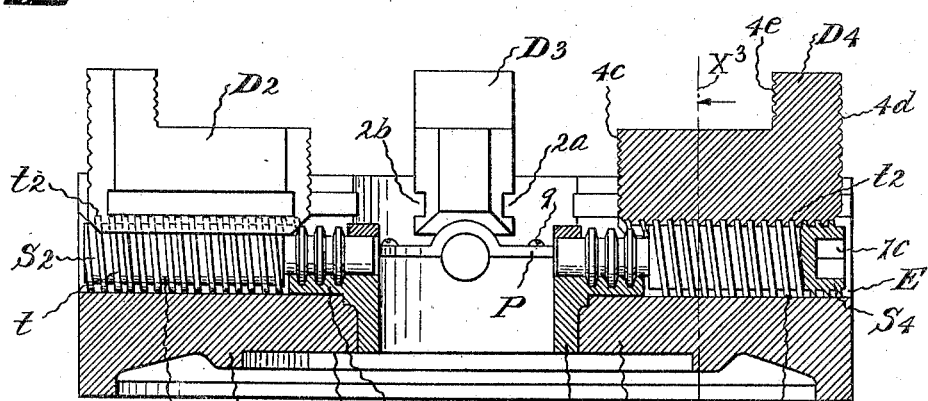
Fig. 2 is a cross-sectional view approximately in line $X^2$, $X^2$, of Fig. 1, but with some details not shown in section in said line; for instance, one of the chuck-jaws, $D^2$, is shown in side view, while another jaw, $D^4$, is shown partially in section.

For engaging the screw S with the bearings H each said bearing is shown having formed therein one or more semi-annular thrust-bearing channels or grooves,—as 8,— each having a pair of thrust-faces, as $8^a$, and $8^b$, (corresponding with said thrust-collars $7^a$). Thus, when the bearings are in place, the screws S may be laid downwardly into their guide-ways E, and thus place the said annular thrust-bearing rings or journals $7^a$, in said semi-annular thrust-bearing channels 8, respectively; next, the jaws D may be slid into their receiving channels C by engaging the usual jaw-guiding ribs, or ways, $2^a$, $2^b$, of the body B in the guide-channels $4^a$, $4^b$, respectively, of the jaws. During this part of the assembling operation, of course the segmental-nut threads, $t^2$, of the jaws will be engaged with the thread $t$ of the screws S, respectively, so that by turning a screw S, the coacting jaw may be slid along on its guides to any required position within the normal working range thereof. In Fig. 2, the screw $S^4$ has a portion broken away for showing a usual form of squared hole $7^c$, wherein the end of a wrench may be inserted, whereby to turn the screw.

Where properly fitted and thus assembled as here explained, the chuck-jaw, as D,—see Figs. 2 and 4,—constitutes a means for holding the coacting screw S down into its seat or guide-way, E, so that said screw will be rotatable between said guide-way and jaw as if within a bearing. This arrangement also operates to normally hold the inner end portion of the journal 7 of the screw S downward into the bearing H, so that said thrust-collars $7^a$ are maintained in proper engagement with said semi-annular thrust faces $8^a$, $8^b$. However, should a jaw D be removed, (as will be required at times in using the chuck), the coacting screw S would be released and might fall out. To prevent such a displacement, and also to assist in retaining screw S in place when the jaw D is drawn out to an extreme position, I have provided the screw-retaining ring P which is in the nature of a bearing cap, and which may be removably secured in place in any convenient manner, as for instance, by a series of small cap-screws, as 9, of suitable number and arrangement.

The several screw-engaging bearings, as H2, H3, H4, and H5, are herein shown in Figs. 2, 6, 7, as being each integrally joined to the immediately adjacent (the contiguous) portion of the bearing-carrier, or ring, N. Thus each of the "bearings H" may be said, when considered as an entirety, to comprise a bearing proper, as H, (Figs. 6, 7), which is fitted to lie down firmly in said guide-way E (see Figs. 2, 3), for the screw S, and also to comprise an anchor bearing, which, (in said construction of Figs. 6, 7), consists of a segmental portion of the ring N, as for instance, the portion between the dotted lines $y$, $y'$, (Figs. 6, 8, 9), and there designated by $n^2$. The proper tensioning or tensely-fixing in place of the bearing H may be accomplished in practice, (in said form and arrangement as indicated in Figs. 2, 6, 7), by making the ring N with the outer face $8^f$ thereof to have (before assembling) a diameter larger than the diameter of the ring-seat face $2^f$, so that when the ring N shall be forcibly pushed into place,—this assembling operation being best performed in a suitable "arbor-press," or analogous machine,—said ring will be compressed or contracted to a smaller size, and will thus have a constantly-acting and relatively powerful expansive force due to the tension of and as between the particles of metal of which said ring is composed. Under these conditions, the screw-engaging bearing H may be said to have been pulled inwardly with relation to the body member B, to a position which is slightly nearer the axis (as X, Fig. 16) of the chuck than the position said bearing originally occupied with relation to the uncontracted ring N, prior to said assembling operation.

Said contractile action and the assembling operation are further illustrated in Fig. 10, where a section of the ring N and of a bearing H, is shown in position for beginning the described forcing-in operation, this being indicated by the arrow $r^{10}$; in said Fig. 10, of course, the aforesaid differences of diameter of the surfaces $8^f$ and $2^f$ are indicated as being very much enlarged in order to secure clearness of illustration; in practice, in the manufacture of any particular size of chuck, the proper amount of said difference in the diameter of the faces $2^f$ and $8^f$, are readily ascertained by trial.

To facilitate a proper inauguration of the contractive action upon ring N, the body-member B may have an annular face, as $f$, against which the edge $d^5$ of the ring N is first set, so that the wedging action natural thereto will assist in starting said ring-contraction by first closing in (to the required amount), the extreme lower-edge portion of the ring. For these reasons, said face $f$ is shown rounded, but evidently it may be inwardly and downwardly inclined by a straight-line form, (not shown), instead of being so inclined by the curved-line form as shown.

The face $8^f$ is preferably located (in the assembled chuck mechanism) slightly below the bearing H, (Fig. 7), since this construction permits the abutting face $2^f$ to be well and cheaply made by a simple turning operation in which the tool used may follow entirely around the ring member N, while this is being machined to correct size. This construction also has the important advantage of providing an annular seat or zone, as $f$, which operates throughout the circuit thereof, as a stop-face for precisely locating the member N, and for thereby limiting the action of the assembling press, (not shown), as will now be readily understood by practical chuck-makers, without a more particular description. By this means,—the respective parts being accurately shaped and sized therefor,—the member N in practice, may be precisely located or positioned in the body-member B, so that the bearings H will be properly seated in the guide-ways E without incurring a risk of springing the bearings out of their proper alinement.

One object accomplished by the system or organization herein set forth, is the subjection of the screw-holding bearings to an initial positioning stress or tensioning with relation to the chuck-body and relative to each other, prior to the application thereto of any work-holding strain. Accordingly, when such a strain is applied, as indicated in Fig. 14, by the arrow 5, the force so exerted by the "work," as W, against the jaw D is transmitted through the screw S and thence through the pair (or pairs) of engaging and coacting screw and bearing faces, to the anchor-bearing, H, with the result of applying to this bearing an outwardly acting force in the direction of the arrow $r^3$, this direction being the same as that of the said previously-produced initial tension. Thus, on the work-holding strain being gradually applied,—as necessarily occurs in practice, by the operator turning the jaw-actuating screw S,—the force thereof is increasingly transmitted through the described faces and is finally resisted by the face $2^t$ in the direction of the arrow $r^2$; hence, as will now be evident, the newly applied work-holding strain will be supported by the pressure of abutting faces which were already under the pressure of forces acting in the same direction, so that the yielding of the members which otherwise would normally occur will be now applied to members that have already yielded under stress, and thereby have been stabilized.

This explanation is in accordance with the well-known circumstance that as regards the requirements of "precision" work,—for which purpose my present improvements are especially designed,—the metal of the machines and tools employed (including the class of chucks in which my improved chuck is comprised) is not and cannot be regarded as a strictly rigid material, but as being always somewhat elastic and mobile, so that the several parts of a chuck must readily and unavoidably change in form and precise position in accordance with the forces or pressures applied thereto. These adverse conditions are minimized in the improved chuck herein illustrated, by means of the preparatory stress for stabilizing in a permanent manner, several screw-holding bearings and their carrier-members, this being done when the chuck is orginally constructed.

In the bearing-and-carrier set as shown in Figs. 6, 7, the carrier member N is integrally continuous throughout the circuit thereof, but this completeness of continuity is not essential in all instances within the purview of my present invention, and in Figs. 11, 12, a modified construction is illustrated in which said carrier member is composite and continuous. In these views, the bearings $H^2$, $H^3$, $H^4$, $H^5$, are shown as each integrally joining with a segmental member, as $N^2$, $N^3$, $N^4$, $N^5$, respectively, each forming one portion of the complete but composite carrier ring. Thus each said bearing corresponds with the bearing and ring-segment shown in Fig. 9, and consists of the bearing proper, as H, and an anchorage flange,—here designated as a ring-segment,—having an outer face, $8^t$, for engaging within the aforesaid inner face of the body portion, B′, forming the compression hoop within which said carrier is held under a contractile stress. When the bearings, H, are four in number, the arcual length of the bearing-flange or segment, as $N^2$, (Fig. 11), may be made considerably less than ninety degrees, and thereby provide the space for a series of tensioning, or straining-up members, as $T^2$, $T^3$, $T^4$, $T^5$, which, as clearly indicated in the drawing (Fig. 12), may be of a slightly tapering form, so as to act as wedges when forced firmly into place between said bearing members.

In Fig. 12, a groove, $2^m$, is formed in the body zone B′, at the lower edge of the face $2^t$, and the lower edge of each of the ring-segments, as $N^2$, etc., is provided with a rim $8^m$ which locks into said groove, thereby positively preventing the bearing segment from being moved upwardly. In assembling this form of the chuck, the several bearings, H, are dropped into place in their seats, E, and are then slid outwardly until their ring segments bear against the body face $2^t$, while the rims, $8^m$, are engaged in said groove $2^m$. Next, the wedge members, T, are forcibly pushed down between said ring-segments, for thereby locking the several parts into a firmly fixed assemblage, and subjecting the entire ring,—by such expansion thereof,—to a powerful contractile force within the body-zone, or "hoop", B′.

In the modified form which is illustrated in Fig. 13, the bearings H are integrally connected with the carrier ring N, in the same manner as already described in connection with Figs. 6 and 7, but a different means is provided for subjecting the bearing carrier ring to contractile pressure within the face $2^{t'}$ of the body B.

The said inner face $2^t$ of the body member in Fig. 3, is here shown in Fig. 13 as being formed slightly conical, as $2^{t'}$, the larger diameter being adjacent to the face $2^k$ of said member. Also, the outer face $8^t$ of the ring N, (Fig. 3), is modified to a conical form, $8^{t'}$; the direction of the inclination, as seen in a sectional view (Fig. 13) being in the same direction as said face $2^{t'}$, but, preferably, slightly divergent therefrom, as indicated for instance by the dotted lines $y^7$, $y^8$. The ring N being inserted in the central opening of the body member B, with the bearings H properly located in their respective seats, E, then a wedge ring, 12, is inserted between said faces $2^{t\prime}$ and $8^{t\prime}$, and is then pushed into place for thereby locking, as by a key, said bearing-carrier firmly in place within the member B. In practice, and in order not to require an upsetting (circumferentially thereof), of said keying-in ring 12, this keying ring may be divided at one or more points (not shown), so as to facilitate the necessary contraction in diameter while being forced into place.

In the arrangement here described, and by suitably proportioning the several parts, that portion of the ring N which lies in the lower zone $z^5$, (see Figs. 7 and 13), may be forcibly compressed in diameter for thereby securing the desired tensity in the positioning of the bearings H. At the same time said keying-in member 12 operates,—in an evident manner,—to very securely and rigidly lock the member N and bearings H accurately in position.

The bearing-carrier N not only serves as an anchorage member for holding (while itself under compression) each of the bearings H from an outwardly radial movement, but said carrier also constitutes the means for resisting any movement of any said bearing toward the center of the chuck. This additional mode of action, while evident from Figs. 1 and 2, is further illustrated by Fig. 16. The inner portion as B', of the body B constitutes in effect a strong ring-compressing hoop by which (in the assembled chuck) the ring-member N may be held under a forcible contraction, sufficient for stabilizing said ring N as against a pressure of the bearings in a direction inwardly of this ring. Thus, by analogy, it may be said that a bearing, as $H^2$, (Fig. 16) is supported on (or against) the center of a semi-circular arch (indicated by the arc lines $y^3$, $y^{3\prime}$), which arch is under a heavy compressive load, and that the ends of such arch are joined at the next adjacent bearings, as $H^3$, $H^5$, with a reversely-disposed semi-circular arch (indicated by the arc line $y^5$) which is under a similar compressive force exerted in a reverse direction. In this manner, in effect, the force exerted on the ring N in the direction of arrow $r^{12}$, by the inwardly-pressed bearing $H^2$, is in large part transmitted from said bearing and through the adjacent quadrants or arcs $y^3$, $y^{3\prime}$, to and through the opposite half-circle $y^5$ of ring N, and thence into that one-half of the annular face-portion $2^t$ of the member B which is opposite to the bearing $H^2$.

The described mode of action as regards the supporting of any one bearing,—as $H^2$, in Fig. 16,—also takes place in respect of each and all of the individual bearings which are in coaction at any one time. Thus the mode of action in resisting an inward movement of said bearing $H^2$ (from the action of jaw $D^2$), ordinarily will take place simultaneously as regards the opposite bearing $H^4$, from the action of the jaw $D^4$; and, similarly, of course, as between the cross-wise pair of bearings $H^3$ and $H^5$. And when all of the bearings are at one time subjected to pressure in said inward direction, the several said forces and resistances coact in a complex manner, so that each bearing coacts through the carrier N with each of the other said bearings; similarly, each plurality of the bearings may properly be said to coact directly with each other plurality of them, and especially so, when the carrier N and all the bearings are comprised in a one-piece member.

This mode of action and bearing-support, may be designated as a method of bearing-support by the coaction of oppositely-disposed and compressively loaded arches. In this system and method, it is evident that the described action chiefly takes place, normally and directly as between the several bearings H and the aforesaid compression-faces $2^f$ and $8^f$ of the body B and ring N, respectively, when this ring is under a sufficient contractive compression for properly holding the bearing in the manner herein set forth. In this connection it should be noted, that in practice it is not feasible to so finish the outer ring-surfaces $8^s$ which are directly in the circuit zone, $z^4$, of the bearings H,—that these surfaces will bear as closely against the chuck-body as does said surfaces $8^f$ of the extended portion (in zone $z^5$) of the ring N. Hence, these surfaces $2^f$, $8^f$, may be said to lie in a high-pressure zone of engagement, (as $z^5$, Fig. 7), while said bearing-zone surfaces, $8^s$, if in any actual pressure-contact, only occupy an adjacent low-pressure zone, as $z^4$, Fig. 7. By these means the manufacture of the chucks, as regards the necessary machining operations, is greatly facilitated, whereby at a low cost, a superior chuck can be furnished.

A further means for and method of bearing-support is illustrated and diagrammatically indicated in Fig. 16, whereby an inward movement of any one bearing, as $H^2$, is prevented by the engagement of the two adjacent bearings, as $H^3$, $H^5$, with the body member B. This may be designated as the method of bearing-support by single-arch and abutments. When the several bearings H are each fitted closely,—(as they should be, in practice),—within their respective seats E, a force applied to a bearing sidewise thereof, as for instance, to the bearing $H^3$, in the direction of arrow $r^{15}$ (Fig.

16), is resisted by the body-member face at 10ª, which face thus serves as a load-receiving abutment for that purpose. Similarly a pressure applied to the opposite bearing H⁵, in the direction of the arrow $r^{16}$ will be resisted by the body-member face at 10ᵇ. Therefore, if an excessive pressure should be applied to bearing H² in the direction of arrow $r^{12}$, (longitudinally of guideway E²), this bearing would tend to slide inwardly, and thus would act to transmit or distribute forces through the adjacent quadrants, or arcs $y^3$, $y^{3'}$, to the bearings H³, H⁵, and thereby force these bearings against said body-member faces, or abutments at 10ª, 10ᵇ, respectively, which are then, in effect, supporting faces for an arch comprising the quadrants or arcs $y^3$, $y^{3'}$, and upon the crown or center of which the bearing H² is supported in the manner already explained. The forces thus distributed from the position of arrow $r^{12}$ to said faces 10ª, 10ᵇ, may be considered as normally following about in the lines $y^{20}$, $y^{21}$; these lines being inclined, as shown, naturally said forces would tend to slide the bearings H³, H⁵, outwardly in their respective seats, but this is prevented, of course, by the engagement of the anchorage faces of said bearings with said inner face 2ᶠ of the body-member B.

In and as regards this method of bearing-support by "single-arch and abutments," it is evident that such portion of the ring N as lies within said high-pressure zone $z^5$, is only incidentally or collaterally involved, so that, when the abutments 10ª, 10ᵇ, are fully effective, said zone-portion $y^5$ need not be fully relied on. However, if in any case the force applied inwardly by the screw S² to bearing H², (Fig. 16), be so great as to unduly compress or distort that high-pressure-zone portion $y^5$ of the ring, then the single-arch and abutment method as taking place in said low-pressure-zone portion of the ring N, becomes fully developed and effective, so that when an excessive load of work is applied to the chuck mechanism, both of the described bearing-support methods are utilized in coaction and with full effect. Thus the two distinct and individually different modes of bearing-support are effective individually and also in combination, so that each reciprocally supplements the other, as occasion may require.

Referring again to Fig. 16, and supposing that bearing H⁴, together with the adjacent part of carrier N between the lines $y^{17}$, $y^{17'}$, to be removed, then it will be evident that a heavy inwardly-acting force applied to bearing H² in the direction of said arrow $r^{12}$, will normally have the effect of tending to spread the carrier ends which then will be contiguous to bearings H³, H⁵, so that the then terminal portions of said member N will abut outwardly against the body-member B at the points 12ª, 12ᵇ, respectively. This tendency, however, evidently exists to some extent with relation to each of the bearings H, without the removal of any portion of member N, since this member (in a "precision" sense, and in accordance with the principles already explained) is necessarily somewhat flexible and mobile. Thus, under the action of such forces as here described, there is a corresponding tendency of accommodation by flexure; this tendency of flexure and accommodation extends throughout the entire circuit of the member N, but is limited, of course,—as to the quantitative development thereof in any portion of said circuit,—by the contractile force to which said member N is subjected by the aforesaid ring-inclosing portion, as B', of the chuck-body.

In chucks of the class herein illustrated, the body-member, as B, is usually provided with a mid-space,—the central opening in Fig. 1,—which, for convenience of manufacture, is preferably of a circular or nearly circular form, and which customarily,—but not necessarily,—is also made in the form of "a bore" extending nearly or entirely through the body-member. Said mid-space, whether or not this is a bore or a through-space, is also and for similar reasons, commonly and preferably positioned concentrically, or nearly so, with the axis of the body-member, B, but in practice some variation in all these features,—including the bearing-carrier seat, 2ᶠ,—is evidently permissible. However, a positioning of said mid-space and also of said seat 2ᶠ, substantially concentric with the body-member axis, is deemed to be desirable in practice in order to facilitate the economical and uniform production of the chucks in quantity and of a precisionized quality.

By comparing Figs. 1 to 7, and the description thereof with Fig. 17, it will now be evident how the surface of the semi-cylindrical, or partly-cylindrical guide-way E, is used in part as a bearing-surface for the screw S and also in part as a supporting seat, face, or surface for receiving thereon the semi-annular, or partly-annular, bearing H; also, how the same guide-surface E of a body B, may be used to support bearings H, having different lengths, respectively. For instance, in Fig. 2, the bearing H is relatively short, whereas in Fig. 17, the length thereof is shown nearly twice as great. For use in a chuck-body of some given size and proportion, (as the body B in Fig. 17), in one instance, a ring N having short bearings H may be secured in the central position as explained, and in another instance, a ring N having much longer bearings H, may be secured in said position. Thus, one and the same portion (adjacent to bearing H) of the same face of a guide-way E,—this face being continuous, uniform and unbroken,—may in one instance constitute in part the bearing-surface for a screw S, and in another instance constitute a supporting-face for a thrust-bearing H.

The modifications and improvements which are herein-described and shown in Figs. 11, 12 and 13, but which are not specifically claimed herein, constitute subject-matter in a copending application Serial No. 338,801.

Having thus described my invention, I claim:—

1. In a chuck, in combination, a body-member having a mid-space opening and having extending outwardly from said opening, guide-ways for jaw-actuating screws; screw-engaging thrust-bearings seated in said guide-ways, respectively, and each comprising an anchorage portion positioned in said opening and engaging outwardly against the body-member; and, a constantly-acting forcing means coactive with said anchorage portions and arranged for exerting outwardly a stabilizing pressure upon said bearings.

2. In a chuck, in combination, a body-member having a mid-space opening and having extending outwardly from said opening, guide-ways for jaw-actuating screws; screw-engaging thrust-bearings seated in the inner ends of said guide-ways, respectively, and each provided integrally with an anchorage portion positioned in said opening and engaging outwardly against the body-member; and, a combined anchorage connector and forcing means secured in said chuck-body opening and integrally connecting said anchorage portions of the bearings and arranged for exerting a constantly-acting stabilizing pressure outwardly upon said bearings.

3. In a chuck, in combination, a body-member having a mid-space opening and having extending outwardly from said opening, guide-ways for jaw-actuating screws; screw-engaging thrust-bearings seated in the inner ends of said guide-ways, respectively, and each provided integrally with a segmental anchorage portion positioned in said opening and engaging outwardly against the body-member; and combined bearing-carrier and forcing means secured in said opening and integrally connecting the bearings with each other through said anchorage portions thereof.

4. In a chuck, in combination, a body-member having a mid-space opening and having extending outwardly from said opening, radially-disposed guide-ways for jaw-actuating screws; screw-engaging thrust-bearings in said guide-ways, respectively, and each provided integrally with an anchorage portion positioned in said opening and engaging outwardly against the body-member; a combined compression-ring and bearing-anchorage connector in said body-member opening and constituted in part of said anchorage portions of the bearings; and, jaw-actuating screws supported in said guide-ways and rotatably engaging with, and longitudinally held in place by, said bearings.

5. In a chuck, in combination, a chuck-body having a central opening and having extending outwardly from said opening, radially-disposed guide-ways for jaw actuating screws; screw-engaging thrust-bearings in said guide-ways, respectively, and each provided integrally with a segmental anchorage portion positioned in said central opening; an annular anchorage connector secured in said chuck-body opening and integrally connecting said anchorage portions of the bearings; jaw-actuating screws supported in said guide-ways and rotatably engaging with, and longitudinally held in place by, said bearings; and, means holding said annular connector under a contractile compression.

6. In a chuck of the class herein described, in combination, a chuck-body having a continuous and inwardly-facing ring-seat and provided with a series of screw-supporting guide-ways radially-disposed in the chuck-body and extending outwardly from the ring-seat; a continuous compression-ring fixed within said ring-seat and held thereby under a contractile pressure; and, screw-engaging bearings integrally connected with and extending outwardly from said ring and seated, respectively, in said guide-ways, whereby each said bearing is stabilized in the chuck-body by an initial tension in a direction for thereby firmly resisting both outward and inward deflection by a work-holding strain.

7. In a chuck of the class herein described, in combination, a chuck-body having a cylindrical and inwardly-facing ring-seat and provided with a series of screw-supporting guide-ways radially-disposed in the chuck-body and extending outwardly from the ring-seat; a continuous compression-ring fixed within said cylindrical ring-seat and held thereby under a contractile pressure; and, screw-engaging bearings integrally connected with and extending outwardly from said ring and seated, respectively, in said guide-ways, whereby each said bearing is stabilized in the chuck-body by an initial tension in a direction for thereby firmly resisting both outward and inward deflection by a work-holding strain.

8. In a chuck of the class herein described, in combination, a chuck-body having a circular and inwardly-facing ring-seat and provided with a series of screw-supporting guide-ways radially-disposed in the chuck-body and extending outwardly from the ring-seat; a continuous and integrally-formed compression-ring fixed within said ring-seat and held thereby under a contractile pressure; and, screw-engaging bearings integrally connected with and extending outwardly from said ring and seated, respectively, in said guide-ways, whereby each said bearing is stabilized in the chuck-body by an initial tension or outward thrust for thereby firmly and initially resisting a work-holding strain.

9. In a chuck of the class described, in combination, a chuck-body having a circular and inwardly-facing ring-seat and provided with a series of screw-supporting guide-ways of semi-cylindrical form and radially-disposed in the chuck-body and extending outwardly from the ring-seat; a continuous and integrally-formed compression-ring fixed in position within said circular ring-seat and held thereby under a contractile pressure; and, screw-engaging bearings of semi-annular form and integrally connected with and extending outwardly from said ring, and seated, respectively, in said guide-ways, whereby each said bearing is supported by the semi-cylindrical surface of a guide-way, and is stabilized in and against the chuck-body by an outward thrust for thereby firmly and initially resisting a work-holding strain.

10. In a chuck, of the class described, in combination, a body-member having a mid-space and a plurality of guide-ways radiating therefrom, jaws slidable in said guide-ways, and jaw-engaging screws rotatably-supported in said guide-ways behind said jaws for actuating the latter, said screws having reduced journals on their inner ends; a continuous and integral circuit-form bearing-carrier secured under contractile pressure in said mid-space of the body-member and having integral therewith channel-shaped screw-journal bearings extending into and seated in the inner ends of said guide-ways and receiving said screw journals; and, coactive thrust-resisting means appurtenant to said bearings and journals for preventing a longitudinal movement of the screws relative to said bearings.

11. In a chuck of the class herein described, in combination, a chuck-body having an inwardly-facing ring-seat and provided with a series of screw-supporting guide-ways radially-disposed in the chuck-body; jaw-actuating screws rotatable in said guide-ways; a continuous compression-ring in position within said ring-seat and held thereby under a contractile pressure; and, screw-engaging bearings extending outwardly from said ring and seated, respectively, in the inner ends of said guide-ways and each stabilized in the chuck-body by the outward thrust of said ring for thereby firmly resisting deflection when a work-holding strain is applied thereto by said screws.

12. In a chuck of the class herein described, in combination, a chuck-body having an inwardly-facing ring-seat and provided with a series of screw-supporting guide-ways radially-disposed in the chuck-body and arranged for receiving jaw-actuating screws rotatable in said guide-ways; a continuous compression-ring in position with said ring-seat and held thereby under a contractile pressure; screw-engaging bearings extending outwardly from said ring and seated, respectively, in the inner ends of said guide-ways and each stabilized in the chuck-body by the outward thrust of said ring; and, a pair of annular and coactive stop-faces, one on the chuck-body and the other on said ring, for positioning said ring in the chuck-body, substantially as set forth.

13. In a chuck, a body-member having a central carrier-chamber and a plurality of guide-ways radiating therefrom, jaws slidable in said guide-ways, and screws in said guide-ways behind said jaws for slidably actuating the latter, said screws having thrust-collared and reduced journals on their inner ends; in combination with a bearing-carrier and connector secured in said chamber of the chuck-body and having integral therewith channel-shaped screw-holding thrust bearings extending therefrom into the inner ends of said guide-ways and fitted to receive said thrust-collared journals, and means appurtenant to the bearing-connector and removably secured thereto for releasably holding the screw-journals in engagement with the bearings.

14. In a chuck, a body-member having a central carrier-chamber and a plurality of guide-ways radiating therefrom, jaws slidable in said guide-ways, and screws in said guide-ways behind said jaws for slidably actuating the latter, said screws having thrust-collared and reduced journals on their inner ends; in combination with a bearing-carrier and connector secured in said chamber of the body-member and having screw-holding thrust bearings extending therefrom into the inner ends of said guide-ways and fitted to receive said thrust-collared journals, and a screw retaining ring secured to said bearing-carrier and having U-shaped portions shaped to form caps in position for engaging over said journals and thereby retain the screws in said guide-ways, and having an exterior size not greater than the screw body, to thereby permit the jaws to pass over said caps.

15. In a chuck, in combination, a body-member having therein a mid-space and having extending outwardly from said space, guide-ways each adapted for receiving a chuck-jaw and a jaw-operating screw, and also having in said space and in a zone adjacent to said guide-ways, an inwardly-facing seat for a bearing-carrier; screw-actuatable jaws slidably supported one in each of said guide-ways; screws supported in and by the guide-ways and operably engaging with the jaws, respectively, and each having an inwardly-extending journal provided transversely with one or more thrust-collar surfaces; journal bearings positioned in said guide-ways at the inner ends thereof, and each having a thrust-resisting engagement with the thrust-collar surfaces of said screw-journal; and, a bearing-carrier connecting rigidly with the inner-end portion of each of said bearings, and also engaging with said inwardly-facing seat therefor of the body-member.

16. In a chuck, in combination, a body-member having therein a mid-space and having extending outwardly from said space, guide-ways each adapted for receiving a chuck-jaw and a jaw-operating screw, and also having in said space and in a zone adjacent to said guide-ways, an inwardly-facing seat for a bearing-carrier; screw-actuatable jaws slidably supported one in each of said guide-ways; screws supported in and by the guide-ways and operably engaging with the jaws, respectively, and each having an inwardly-extending journal provided transversely with one or more thrust-collar surfaces; journal bearings positioned in said guide-ways at the inner ends thereof, and each having a thrust-resisting engagement with the thrust-collar surfaces of said screw-journal; and, a one-piece annular bearing-carrier integrally connecting with the inner-end portion of each of said bearings, and also engaging under a contractile pressure with said inwardly-facing seat therefor of the body-member.

17. In a chuck, in combination, a body-member having therein a mid-space and having extending outwardly from said space, a plurality of guide-ways, each adapted for receiving and operably supporting a chuck-jaw and a jaw-operating screw, and also having in said mid-space and in a continuous-surface zone adjacent to said guide-ways, an inwardly-facing and continuous seat for a bearing-carrier; screw-actuatable jaws slidably supported one in each of said guide-ways; screws supported in and by the guide-ways and operably engaging with the jaws, respectively, and each having an inwardly-extending journal provided with one or more pairs of thrust-resisting collar surfaces; semi-annular journal bearings positioned in said guide-ways at the inner ends thereof, and each having a thrust-resisting engagement with said screw-journal collar surfaces; and, a bearing-carrier connecting rigidly with the inner-end portion of each of said bearings, and also secured in place by engaging under pressure within said inwardly-facing seat therefor of the body-member.

18. In a chuck, in combination, a body-member having therein a mid-space and having extending outwardly from said space, a plurality of guide-ways, each adapted for receiving and operably supporting a chuck-jaw and a jaw-operating screw, and also having in said space and in a continuous-surface zone adjacent to said guide-ways, an inwardly-facing seat for a bearing-carrier; screw-actuatable jaws slidably supported one in each of said guide-ways; screws supported in and by the guide-ways and operably engaging with the jaws, respectively, and each having an inwardly-extending journal provided with thrust-resisting surfaces; journal bearings positioned in said guide-ways at the inner ends thereof, and each having a thrust-resisting engagement with said thrust-resisting surfaces of the screw; and an annular one-piece bearing-carrier connecting integrally with the inner-end portion of each of said bearings, and also secured in place by engaging under pressure within said inwardly-facing seat therefor of the body-member.

19. In a chuck, in combination, a chuck-body having a mid-space opening and having extending outwardly from said opening, radially-disposed guide-ways for jaw-actuating screws, and screw-engaging thrust-bearings seated in said guide-ways, respectively, and each provided integrally with a segmental anchorage portion, these anchorage portions being extended and integrally connected to form an annular compression-ring adapted to be held under a contractile pressure within said chuck-body opening.

20. In a chuck, a body-member having an axial bore and a plurality of guide-ways radiating therefrom, jaws slidable in said guide-ways, and screws in said guide-ways behind said jaws for actuating the latter, said screws having reduced journals on their inner ends; in combination with a ring secured in said bore of the body-member and having integral channel-shaped thrust bearings extending into the inner ends of said guide-ways and receiving said journals, said journals having circumferential thrust ribs and said bearings having transverse channels in which said ribs are received.

21. An article of manufacture consisting of a single member comprising a continuous ring for reception under contractile compression in the axial bore of a lathe chuck, and thrust bearings radiating from and integral with said ring for engagement with the actuating screws of the chuck jaws.

22. An article of manufacture comprising a continuous ring for reception in the axial bore of a lathe chuck, and channel-shaped thrust bearings integral with and radiating from said ring for engagement with the journals of the jaw-actuating screws of the chuck, and also comprising screw-journal-retaining means removably secured to the ring.

23. An article of manufacture comprising a continuous ring for reception in the axial bore of a lathe chuck, and channel-shaped thrust bearings integral with and radiating from said ring for engagement with the journals of the chuck-jaw actuating screws, said bearings having one or more transverse channels to receive corresponding external thrust-resisting collars on said journals.

24. An article of manufacture comprising a continuous ring for reception under contractile pressure in the axial bore of a lathe chuck, and channel-shaped thrust bearings integral with and radiating from said ring for engagement with the journals of the jaw-actuating screws of the chuck, and a retaining ring having U-shaped cap portions coacting with said channel-shaped bearings to retain the screw journals in the latter.

FRANK C. SMART.

Witnesses:
H. H. WALKLEY,
C. P. BROADHURST.